(12) United States Patent
Sasaki

(10) Patent No.: US 12,275,148 B2
(45) Date of Patent: Apr. 15, 2025

(54) INFORMATION PROCESSING APPARATUS, SYSTEM, INFORMATION PROCESSING METHOD, METHOD OF MANUFACTURING PRODUCTS, AND RECORDING MEDIUM

(71) Applicant: CANON KABUSHIKI KAISHA, Tokyo (JP)

(72) Inventor: Hironobu Sasaki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 209 days.

(21) Appl. No.: 18/072,850

(22) Filed: Dec. 1, 2022

(65) Prior Publication Data

US 2023/0173670 A1 Jun. 8, 2023

(30) Foreign Application Priority Data

Dec. 7, 2021 (JP) ................... 2021-198197

(51) Int. Cl.
*B25J 9/16* (2006.01)

(52) U.S. Cl.
CPC ..... *B25J 9/163* (2013.01); *G05B 2219/33034* (2013.01); *G05B 2219/39001* (2013.01)

(58) Field of Classification Search
CPC ... B25J 9/163; B25J 9/1671; B25J 9/16; B25J 9/0081; B25J 9/1602; B25J 9/1679; G05B 2219/33034; G05B 2219/39001
USPC ........................................................ 700/253
See application file for complete search history.

(56) References Cited

U.S. PATENT DOCUMENTS

| | | | | |
|---|---|---|---|---|
| 2014/0236565 | A1* | 8/2014 | Kuwahara | B25J 9/1671 703/22 |
| 2019/0221037 | A1* | 7/2019 | Sugaya | G06T 13/20 |
| 2023/0141876 | A1* | 5/2023 | Kabutan | B25J 9/163 700/250 |

FOREIGN PATENT DOCUMENTS

| | | | | | |
|---|---|---|---|---|---|
| CN | 108942946 | A | * | 12/2018 | ............ B25J 9/1605 |
| CN | 112085987 | A | * | 12/2020 | |
| CN | 113687656 | A | * | 11/2021 | ............ B25J 11/00 |
| JP | H0580842 | A | * | 4/1993 | |
| JP | H06-047689 | A | | 2/1994 | |
| JP | H10291179 | A | * | 11/1998 | |
| JP | H11175150 | A | * | 7/1999 | |
| JP | H11231933 | A | * | 8/1999 | |
| JP | 2000016515 | A | * | 1/2000 | |
| JP | 2000016516 | A | * | 1/2000 | |
| JP | 2000263382 | A | * | 9/2000 | |
| JP | 2001306148 | A | * | 11/2001 | |
| JP | 3533066 | B2 | * | 5/2004 | |
| JP | 2004237364 | A | * | 8/2004 | |

(Continued)

OTHER PUBLICATIONS

JP2019171501A; Yoshida et al.; Nihon Densan KK; Robot Interference Determination Device, Robot Interferencedetermination Method and Program (Year: 2019).*

(Continued)

*Primary Examiner* — B M M Hannan
(74) *Attorney, Agent, or Firm* — Venable LLP

(57) ABSTRACT

An information processing apparatus includes an information processing portion. The information processing portion is configured to accept registration of first teach data and second teach data such that the first teach data and the second teach data are associated with each other. The first teach data is related to a robot arm. The second teach data is related to a peripheral apparatus disposed around the robot arm.

16 Claims, 11 Drawing Sheets

(56) References Cited

FOREIGN PATENT DOCUMENTS

| | | | |
|---|---|---|---|
| JP | 2012-011476 A | 1/2012 | |
| JP | 2016-093869 A | 5/2016 | |
| JP | 2019-171501 A | 10/2019 | |
| JP | 7124947 B1 * | 8/2022 | ............ B25J 9/163 |
| KR | 19990068189 A * | 8/1999 | |

OTHER PUBLICATIONS

CN113687656A; Wei et al.; Aubo Beijing Intelligent Tech Co Ltd.; Robot control method and system. (Year: 2021).*

JP7124947B1;Planning System, Planning Method, and Planning Program (Year: 2022).*

* cited by examiner

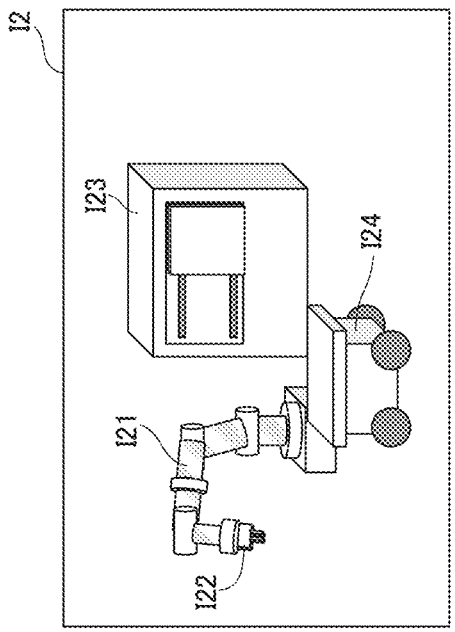
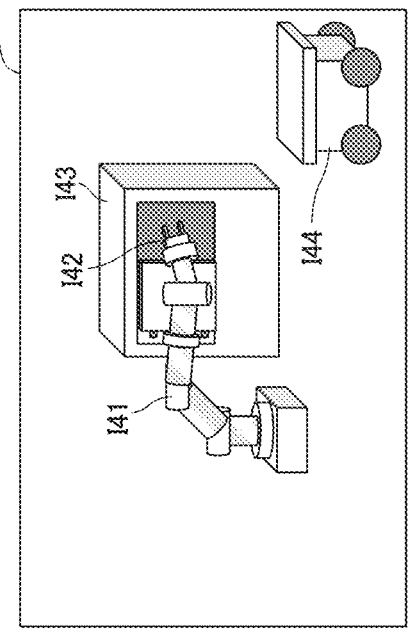
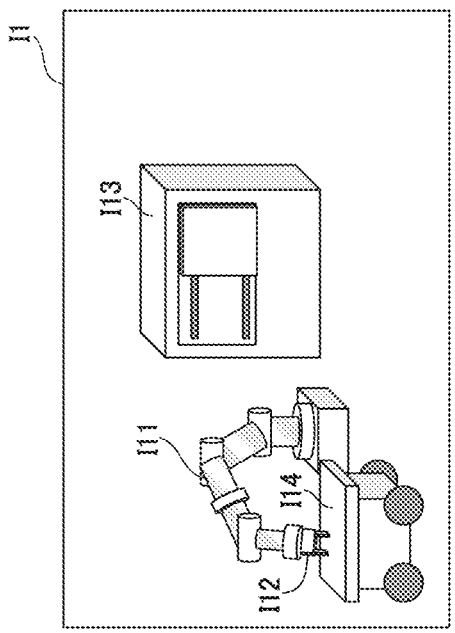
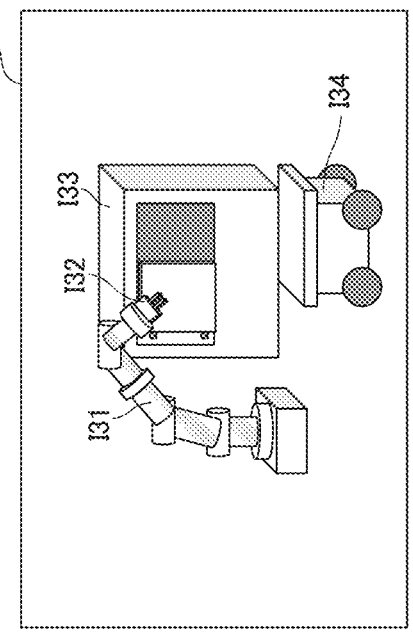

INFORMATION PROCESSING APPARATUS, SYSTEM, INFORMATION PROCESSING METHOD, METHOD OF MANUFACTURING PRODUCTS, AND RECORDING MEDIUM

BACKGROUND OF THE INVENTION

Field of the Invention

The present disclosure relates to information processing.

Description of the Related Art

In general, a simulator that can create teach data for a robot arm by using a computer is known. The simulator can simulate the operation of a 3D model that corresponds to a robot arm, in a three-dimensional virtual space. Specifically, the simulator simulates the operation of a 3D model that corresponds to a robot arm, depending on the teach data for the robot arm, by using a computer. In this simulation, a user can check the operation of the robot arm by checking the operation of the 3D model. Japanese Patent Application Publication No. H06-47689 discloses a method that controls a robot arm depending on the teach data registered by such a simulator.

SUMMARY OF THE INVENTION

According to one aspect of the present invention, an information processing apparatus includes an information processing portion. The information processing portion is configured to accept registration of first teach data and second teach data such that the first teach data and the second teach data are associated with each other. The first teach data is related to a robot arm. The second teach data is related to a peripheral apparatus disposed around the robot arm.

Further features of the present invention will become apparent from the following description of exemplary embodiments with reference to the attached drawings.

BRIEF DESCRIPTION OF THE DRAWINGS

FIG. 8A is a diagram illustrating one example of overall images of the first embodiment.

FIG. 8B is a diagram illustrating one example of overall images of the first embodiment.

FIG. 8C is a diagram illustrating one example of overall images of the first embodiment.

FIG. 8D is a diagram illustrating one example of overall images of the first embodiment.

DESCRIPTION OF THE EMBODIMENTS

In an actual site such as a factory, a robot arm operates not alone, but in synchronization with peripheral apparatuses. In such a system, teaching work for synchronizing the robot arm and the peripheral apparatuses takes time.

The present disclosure is to simplify the teaching work of the whole system.

Hereinafter, some embodiments of the present disclosure will be described in detail with reference to the accompanying drawings.

First Embodiment

Figure 1:
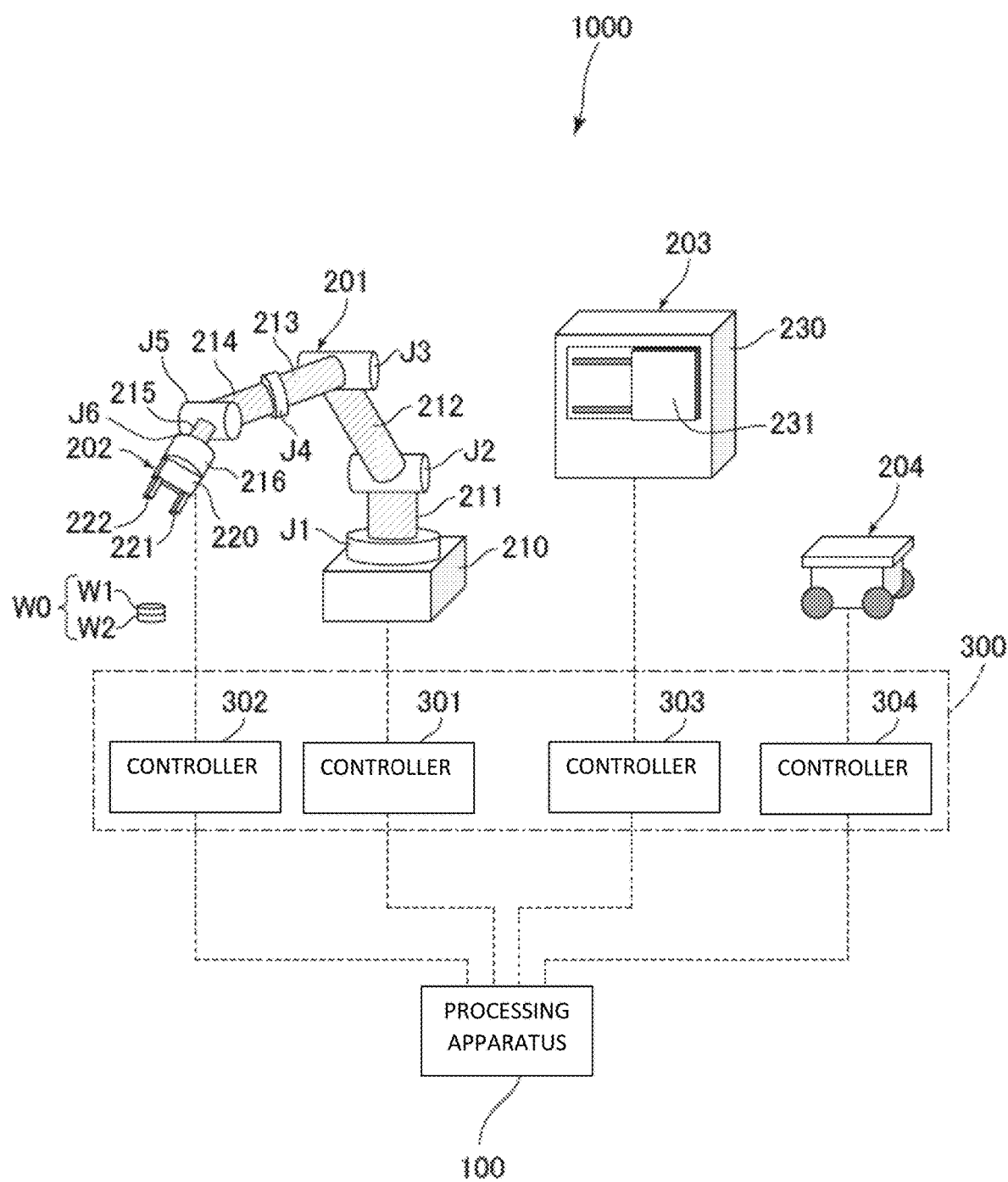
FIG. 1 is a diagram illustrating a robot system that is one example of a system of a first embodiment.

FIG. 1 is a diagram illustrating a robot system 1000 that is one example of a system of a first embodiment The robot system 1000 is disposed in a factory or the like, and is used for manufacturing a product W0. For example, the product W0 is constituted by workpieces W1 and W2, and is manufactured by the robot system 1000 assembling the workpiece W1 to the workpiece W2. The product W0 may be a final product or an intermediate product. In another case, a cutting machine or a grinding machine may be disposed in the robot system 1000, and a product may be manufactured by machining the workpiece W1 or W2.

The robot system 1000 includes a robot arm 201, a robot hand 202, a processing machine 203, and an automatic guided vehicle (AGV) 204. Each of the robot hand 202, the processing machine 203, and the AGV 204 is one example of peripheral apparatuses, and is disposed around the robot arm 201. Note that although the description will be made, in the first embodiment, for a case where the robot system 1000 includes the plurality of peripheral apparatuses 202 to 204, the present disclosure is not limited to this. For example, the robot system 1000 has only to include at least one peripheral apparatus.

For example, the robot arm 201 is a vertically articulated six-axis robot arm, and includes a plurality of links 210 to 216 linked with each other via a plurality of joints J1 to J6. Among the plurality of links 210 to 216, the link 210 is a base, and is fixed to a stand (not illustrated), for example.

The robot hand 202 is one example of end effectors, and includes a hand body 220 and a plurality of (e.g., two) claws 221 and 222. The claws 221 and 222 are supported by the hand body 220 such that the claws 221 and 222 can open and close. In the first embodiment, the claws 221 and 222 move independently from each other. However, the present disclosure is not limited to this. For example, the claws 221 and 222 may move together with each other. The hand body 220 is a base that supports the two claws 221 and 222. The hand body 220 of the robot hand 202 is attached to a predetermined portion of the robot arm 201, such as the link 216.

In the first embodiment, the workpiece W1 can be held by moving the claws 221 and 222. In addition, the workpiece W1 can be moved by moving the robot arm 201 in a state where the workpiece W1 is held, so that the workpiece W1 can be assembled to the workpiece W2. The processing machine 203 can perform a predetermined process, such as a cutting process or a grinding process, on an object; and includes a machine body 230 and a door 231. The door 231 is supported by the machine body 230 such that the door 231 can be opened and closed. The AGV 204 can move around the robot arm 201.

In addition, the robot system 1000 includes a control unit 300. The control unit 300 includes a controller 301 that controls the robot arm 201, a controller 302 that controls the robot hand 202, a controller 303 that controls the processing machine 203, and a controller 304 that controls the AGV 204. Each of the controllers 301 to 304 is a computer. Note that although the description will be made for a case where the control unit 300 is constituted by a plurality of computers, the control unit 300 may be constituted by a single computer.

Furthermore, the robot system 1000 includes an information processing apparatus 100. The information processing apparatus 100 is a computer, and functions as a simulator that can perform computer simulation for allowing a user to check the operation of the robot arm 201 and the peripheral apparatuses 202 to 204.

In the first embodiment, the information processing apparatus 100 creates teach data for the robot arm 201 and the peripheral apparatuses 202 to 204 by a user operating the information processing apparatus 100. The teach data is referred to also as teach points. The information processing apparatus 100 sends teach data for each of the robot arm 201 and the peripheral apparatuses 202 to 204, to a corresponding one of the plurality of controllers 301 to 304. The controllers 301 to 304 receive the respective teach data; and control the robot arm 201 and the peripheral apparatuses 202 to 204, depending on the respective teach data received.

In the first embodiment, the teach data for the robot arm 201 is, for example, information on angles of the joints J1 to J6, or information on a position and posture of the distal end of the robot arm 201 in a work space where the robot arm 201 is disposed. The information on angles of the joints J1 to J6 serves also as teach data for the links 211 to 216. The teach data for the robot hand 202 is information on positions of the claws 221 and 222 with respect to the hand body 220. The information on positions of the claws 221 and 222 serves also as teach data for the claws 221 and 222. The teach data for the processing machine 203 is, for example, information on a position of the door 231 with respect to the machine body 230. The teach data for the AGV 204 is, for example, information on a position and posture of the AGV 204 in the work space where the robot arm 201 is disposed.

Figure 2:
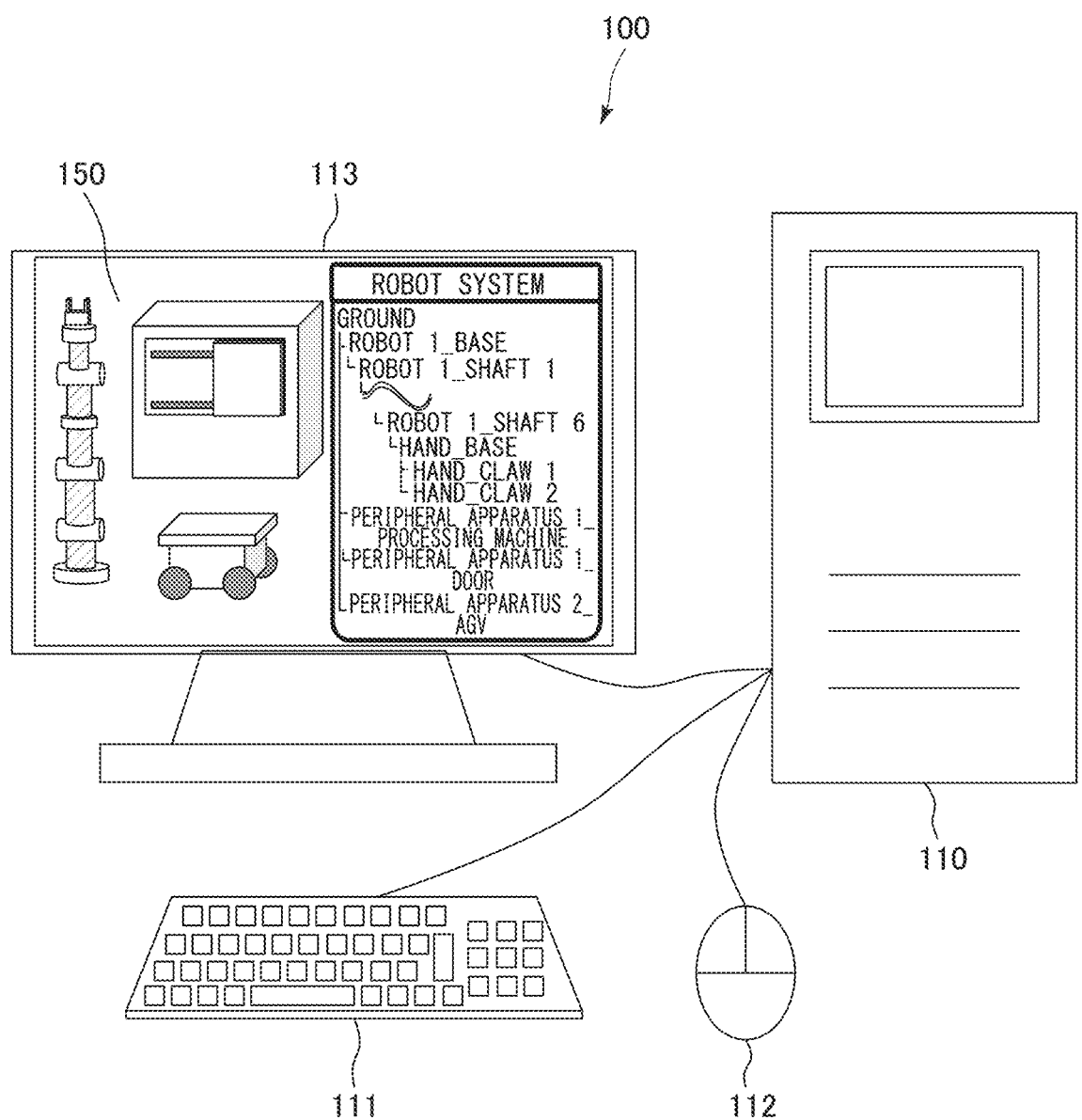
FIG. 2 is a diagram illustrating an information processing apparatus of the first embodiment.

FIG. 2 is a diagram illustrating the information processing apparatus 100 of the first embodiment. The information processing apparatus 100 includes a computer body 110, a keyboard 111, and a mouse 112. Each of the keyboard 111 and the mouse 112 is one example of input portions connected to the computer body 110. In addition, the information processing apparatus 100 includes a monitor 113 that is one example of display portions. The monitor 113 is a display that includes a display screen 150 on which various images are displayed. The computer body 110 is a computing apparatus. Note that although the description will be made for a case where the input portions and the display portion are devices separated from each other, the present disclosure is not limited to this. For example, the input portions and the display portion may be integrated into a single device, such as a touch panel display. Hereinafter, the description will be made for a case where the input devices are the keyboard 111 and the mouse 112 and the display device is the monitor 113. In addition, although the description will be made for a case where the information processing apparatus 100 is a desktop PC that is a general-purpose computer, the present disclosure is not limited to this. For example, the information processing apparatus 100 may be another general-purpose computer such as a laptop PC, a tablet PC, or a smartphone, or may be a teaching pendant.

Figure 3:
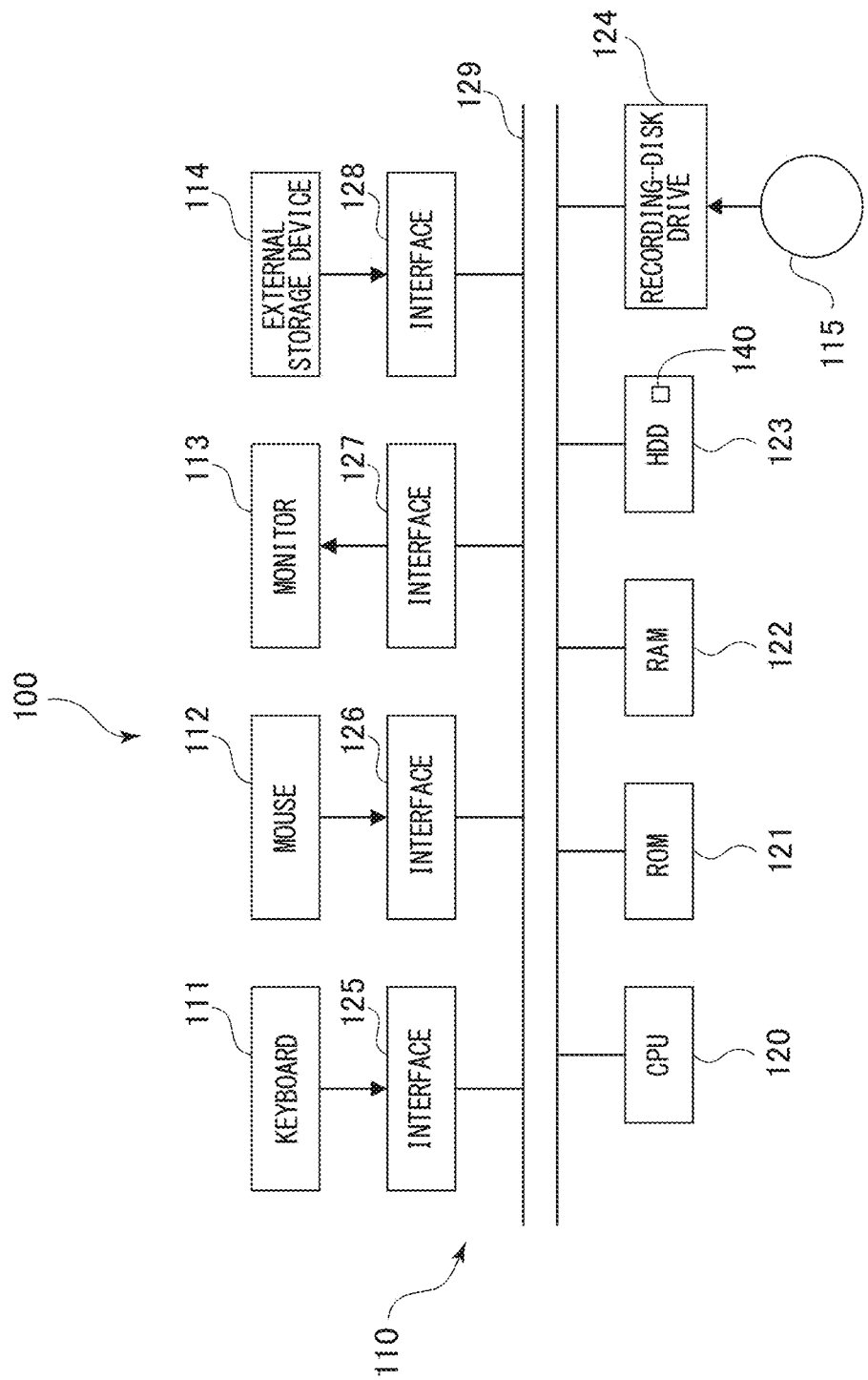
FIG. 3 is a block diagram of the information processing apparatus of the first embodiment.

FIG. 3 is a block diagram of the information processing apparatus 100 of the first embodiment The computer body 110 includes a central processing unit (CPU) 120 that is one example of information processing portions, and that is one example of processors. In addition, the computer body 110 also includes a read only memory (ROM) 121, a random access memory (RAM) 122, and a hard disk drive (HDD) 123, each of which is one example of storage devices. In addition, the computer body 110 also includes a recording-disk drive 124 and a plurality of interfaces 125 to 128. The interfaces 125 to 128 are input/output interfaces. The CPU 120, the ROM 121, the RAM 122, the HDD 123, the recording-disk drive 124, and the interfaces 125 to 128 are communicatively connected with each other via a bus 129.

The ROM 121 stores a base program related to the operation of the computer. The RAM 122 is a storage device that temporarily stores various types of data, such as results of a computing process performed by the CPU 120. The HDD 123 can store various types of data, such as results of a computing process performed by the CPU 120 and data obtained from an external device. The HDD 123 can also store component information of the robot arm 201 and the peripheral apparatuses 202 to 204. In the first embodiment, the HDD 123 stores a program 140 that causes the CPU 120 to perform various processes. The program 140 is a piece of application software that can be executed by the CPU 120.

The CPU 120 executes below-described information processing by executing the program 140 stored in the HDD 123. The recording-disk drive 124 can read various types of data and a program stored in a recording disk 115. The program 140 may be stored in the recording disk 115, and may be provided from the recording disk 115 to the information processing apparatus 100.

Note that although the program 140 is stored in the HDD 123 in the first embodiment, the present disclosure is not limited to this. The program 140 may be recorded in any recording medium as long as the recording medium is a computer-readable non-transitory recording medium. For example, a flexible disk, a hard disk, an optical disk, a magneto-optical disk, a magnetic tape, a nonvolatile memory, or the like may be used as the recording medium that provides the program 140 to the computer.

The interface 125 is connected with the keyboard 111, and the interface 126 is connected with the mouse 112. A user can input data into the computer body 110 by operating an input device, such as the keyboard 111 or the mouse 112. The interface 127 is connected with the monitor 113. The monitor 113 can display, on the display screen 150, various types of images, including a user interface image used for inputting or editing data and an image used for displaying the state of a component model or the like in a three-dimensional virtual space. Note that in the first embodiment, the user interface image is a graphical user-interface image. The interface 128 can be connected with an external storage device 114, such as a rewritable nonvolatile memory or an external HDD.

Figure 4:
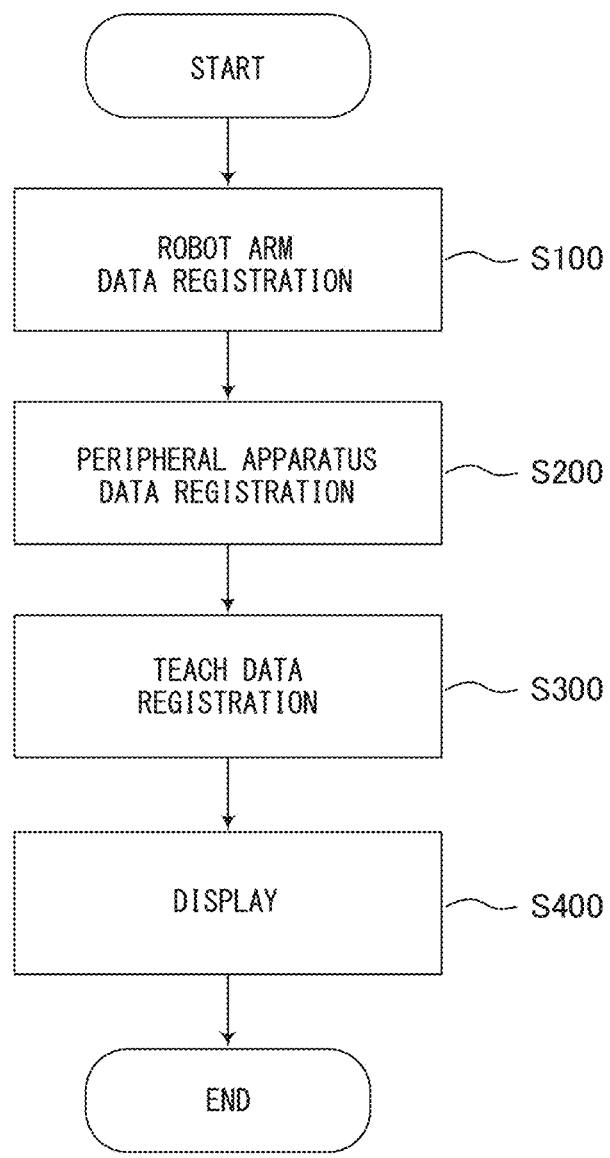
FIG. 4 is a flowchart illustrating an information processing method performed by the information processing apparatus of the first embodiment.

FIG. 4 is a flowchart illustrating an information processing method performed by the information processing apparatus 100 of the first embodiment. First, the CPU 120 accepts the registration of structural data of the robot arm 201 performed by a user (S100). The structural data is model data of a virtual object that corresponds to a structural object. The structural data includes three-dimensional shape data of a component of the virtual object, and data on a connection method for connecting components.

Figure 5A:
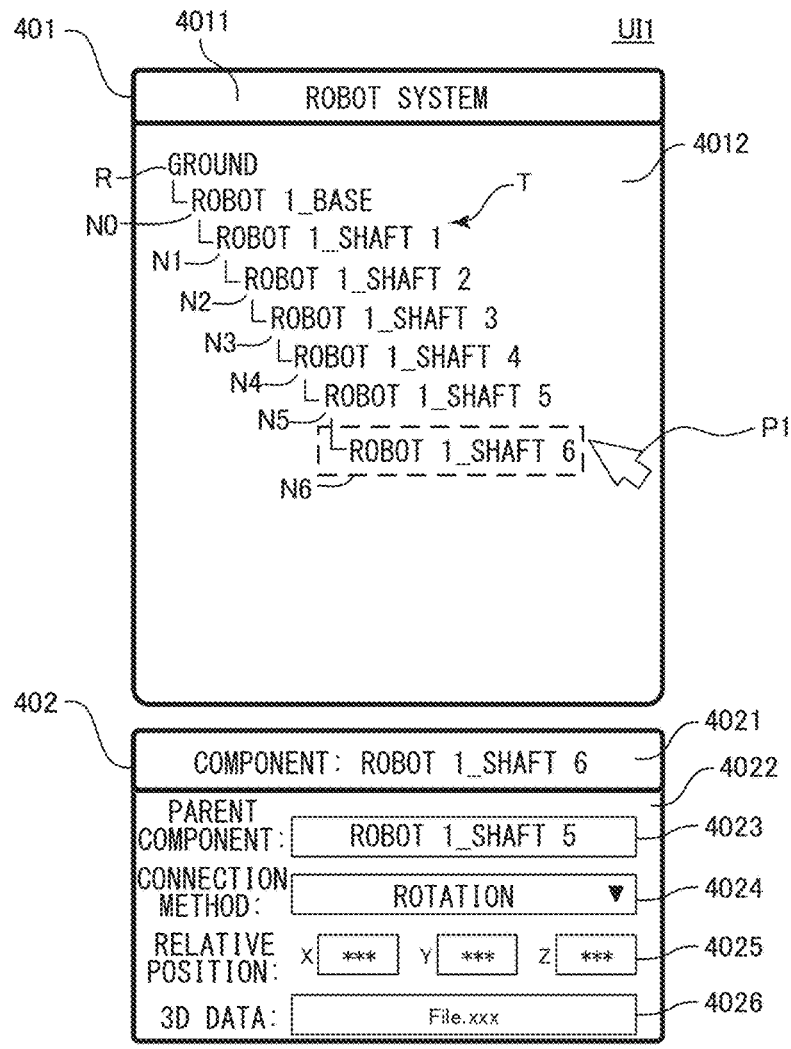
FIG. 5A is a diagram illustrating a user interface image of the first embodiment.
Figure 5B:
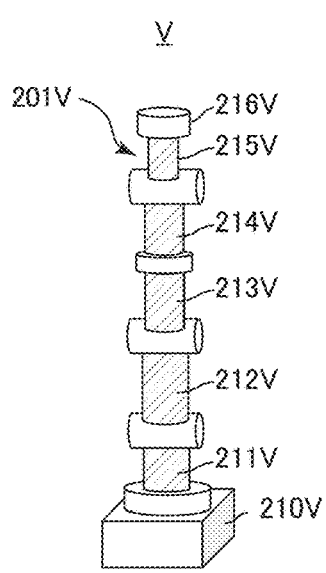
FIG. 5B is a diagram illustrating a virtual space, and a virtual object disposed in the virtual space in the first embodiment

FIGS. 5A and 5B are diagrams for explaining Step S100. FIG. 5A illustrates a user interface image UI1 displayed on the display screen 150 of the monitor 113 illustrated in FIG. 2. FIG. 5B illustrates a virtual space V defined in a process performed by the CPU 120, and a virtual object disposed in the virtual space V The virtual space V corresponds to the above-described work space. The user interface image UI1 illustrated in FIG. 5A includes a window 401 and a window 402. The CPU 120 can accept the registration of a virtual robot arm 201V that corresponds to the robot arm 201, in the window 401 and the window 402 of the user interface image UI1.

The window 401 includes a title bar 4011 and a registration area 4012. In the title bar 4011, a name such as "robot system" is displayed as a title. The registration area 4012 is an area in which a user can input registration information by using the keyboard 111 and the mouse 112, which are one example of input devices. Via the registration area 4012, the CPU 120 accepts the registration of information performed by a user. FIG. 5A illustrates a state in which the virtual robot arm 201V that corresponds to the robot arm 201 is registered by a user. The virtual robot arm 201V is one example of a first model (data), and is a model that includes three-dimensional shape data (hereinafter referred to as 3D data) corresponding to the robot arm 201.

The CPU 120 disposes the virtual robot arm 201V, registered by a user, in the virtual space V. The virtual robot arm 201V includes a plurality of components 210V to 216V associated with each other. The components 210V to 216V correspond to the links 210 to 216, respectively.

For example, the 3D data of each of the components 210V to 216V of the virtual robot arm 201V is CAD data. The 3D data of each of the components 210V to 216V is provided with a unique file name, and is stored in a storage device, such as the HDD 123, as a file that the CPU 120 can refer to.

As illustrated in FIG. 5A, the information of the virtual object is defined by using a tree structure T in which nodes are branched from a root R and associated with each other. Thus, the information processing apparatus 100 of the first embodiment sets the virtual object in the virtual space V by using the information of the virtual object. In the tree structure T, the nodes can be set freely by a user. That is, the nodes can be added, edited, or deleted freely by a user. In addition, a user can freely give names to the root R and the nodes.

Since the vertically articulated robot arm 201 has the plurality of links 210 to 216 linked with each other in series, a plurality of nodes N0 to N6 is linked with each other in series with respect to the root R, and registered. The root R corresponds to the virtual space V. The nodes N0 to N6 correspond to the components 210V to 216V of the virtual robot arm 201V, respectively.

In the example of FIG. 5A, a name "ground" is given to the root R, and registered by a user. In addition, the node N0 of a child whose parent is the root R, and a name "robot 1_base" corresponding to the Node N0 are registered by a user. In addition, the node N1 of a child whose parent is the Node N0, and a name "robot 1_shaft 1" corresponding to the Node N1 are registered by a user. The nodes N2 to N6 are also registered by a user, like the node N1. For example, the node N6 of a child whose parent is the Node N5, and a name "robot 1_shaft 6" corresponding to the Node N6 are registered by a user. In this manner, the nodes N0 to N6 defined with respect to the root R, and unique names of the nodes N0 to N6 are registered by a user.

Next, a method of registering the information corresponding to each of the nodes N0 to N6 will be described by using the node N6 as an example. Suppose that the node N6 is selected by a user operating a mouse pointer P1 in the registration area 4012 of the window 401. Responding to the selection operation, the CPU 120 causes the monitor 113 to display the window 402 as the user interface image UI1. The window 402 is a window in which the CPU 120 can accept the registration of information of the node N6. Note that the method of displaying the window 402 is not limited to this. For example, the CPU 120 may cause the monitor 113 to display a robot arm image so that a user can select a component image of the virtual robot arm 201V by operating the mouse pointer P1. The robot arm image is a model image that corresponds to the virtual robot arm 201V illustrated in FIG. 5B. In this case, the CPU 120 may cause the monitor 113 to display the window 402 that corresponds to a component image selected by a user by operating the mouse pointer P1 in the robot arm image.

The window 402 of FIG. 5A illustrates a state in which the information has already been registered by a user. The window 402 includes a title bar 4021 and a registration area 4022. In the title bar 4021, the name "robot 1_shaft 6" is displayed as a name registered for the node N6. The registration area 4022 includes a box 4023 and a box 4024. In this case, the name of the parent node N5 is registered in the box 4023, and a connection method that connects the component 216V of the Node N6 and the component 215V of the parent node N5 is selected and registered in the box 4024. In addition, the registration area 4022 includes a box 4025 and a box 4026. In this case, a relative position of the component 216V to the component 215V of the parent node N5 is registered in the box 4025, and the file name of 3D data of the component 216V of the node N6 itself is registered in the box 4026. A user can input information in the boxes 4023 to 4026 by using the keyboard 111 and the mouse 112.

As described above, in Step S100, the CPU 120 accepts the registration of structural data of the robot arm 201 performed by a user operating the input devices. Specifically, the CPU 120 can accept the registration of the virtual robot arm 201V in the user interface image UI1. That is, the CPU 120 can accept the registration of the virtual robot arm 201V by using the names, "robot 1_base", "robot 1_shaft 1", . . . , and "robot 1_shaft 6", assigned to the virtual robot arm 201V. Each of the names, "robot 1_base", "robot 1_shaft 1", . . . , and "robot 1_shaft 6", is one example of a third name.

Note that although the description has been made for the case where the registration is performed, component by component, for the components 210V to 216V that correspond to the links 210 to 216 of the robot arm 201, the present disclosure is not limited to this. For example, the whole of the virtual robot arm 201V, which corresponds to the robot arm 201, may be registered at a time. In this case, a file that contains data of all the components 210V to 216V of the virtual robot arm 201V may be prepared. In another case, a plurality of robot arms may be disposed. In this case, a plurality of virtual robot arms may be registered.

The CPU 120 then accepts the registration of structural data of the peripheral apparatuses 202 to 204, performed by a user (S200). Note that Step S200 merely differs from Step S100 in that the information on an object to be registered is the information on the peripheral apparatuses 202 to 204, not the information on the robot arm 201. Thus, the process in Step S200 is the same as that in Step S100.

Figure 6A:
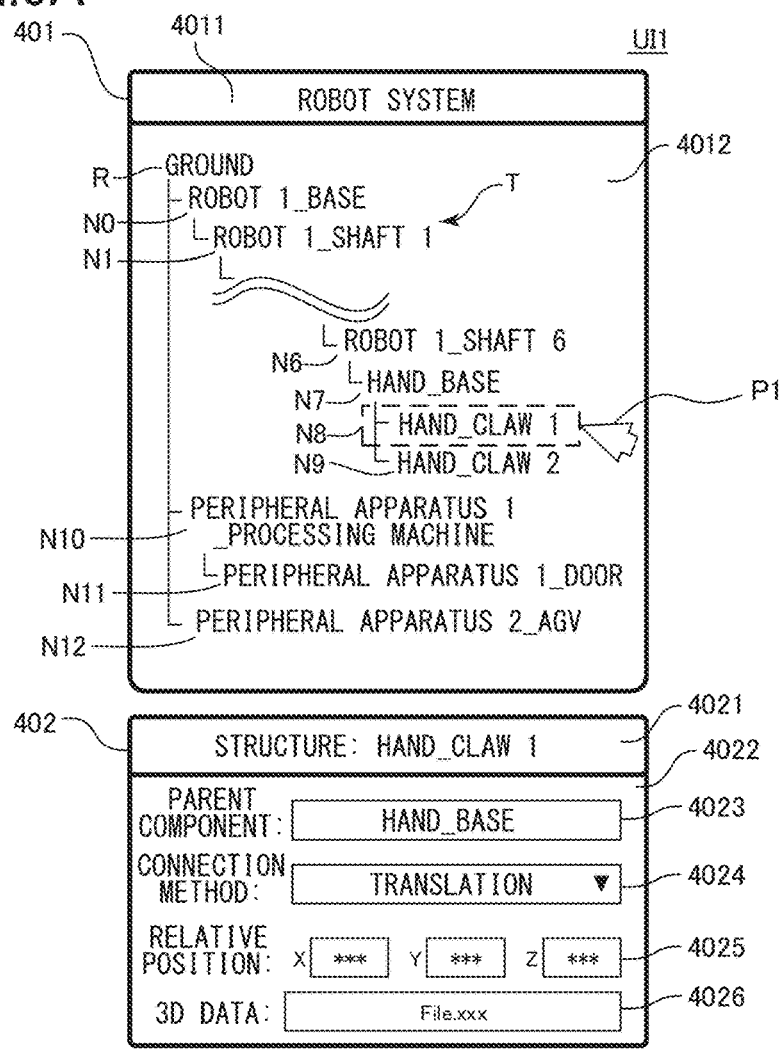
FIG. 6A is a diagram illustrating a user interface image of the first embodiment.
Figure 6B:
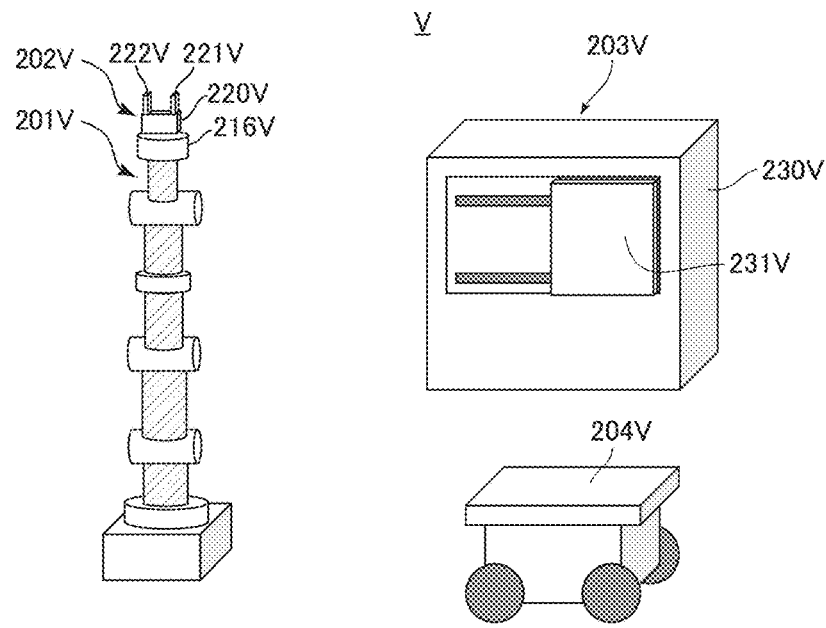
FIG. 6B is a diagram illustrating a virtual space, and virtual objects disposed in the virtual space in the first embodiment

FIGS. 6A and 6B are diagrams for explaining Step S200. FIG. 6A illustrates a user interface image UI1 displayed on the display screen 150 of the monitor 113 illustrated in FIG. 2. FIG. 6B illustrates a virtual space V defined in a process performed by the CPU 120, and virtual objects disposed in the virtual space V. As in FIG. 5A, the user interface image UI1 illustrated in FIG. 6A includes a window 401 and a window 402. The CPU 120 can accept the registration of virtual peripheral apparatuses 202V to 204V that correspond to the peripheral apparatuses 202 to 204, in the window 401 and the window 402 of the user interface image UI1.

FIG. 6A illustrates a state in which a virtual robot hand 202V that corresponds to the robot hand 202 is registered by a user. The virtual robot hand 202V is one example of a second model (data), and is a model that includes 3D data corresponding to the robot hand 202. In addition, FIG. 6A illustrates a state in which a virtual processing machine 203V that corresponds to the processing machine 203 is registered by a user. The virtual processing machine 203V is one example of a second model, and is a model that includes 3D data corresponding to the processing machine 203. In addition, FIG. 6A illustrates a state in which a virtual AGV 204V that corresponds to the AGV 204 is registered by a user. The virtual AGV 204V is one example of a second model, and is a model that includes 3D data corresponding to the AGV 204.

The CPU 120 disposes the virtual peripheral apparatuses 202V to 204V, registered by a user, in the virtual space V The virtual robot hand 202V includes a plurality of components 220V to 222V associated with each other. The component 220V corresponds to the hand body 220, the component 221V corresponds to the claw 221, and the component 222V corresponds to the claw 222. The virtual processing machine 203V includes a plurality of components 230V and 231V. The component 230V corresponds to the machine body 230, and the component 231V corresponds to the door 231. The virtual AGV 204V is, for example, constituted by a single component; and corresponds to the AGV 204.

The 3D data of a component of each of the virtual peripheral apparatuses 202V to 204V is CAD data, for example. The 3D data of each component is provided with a unique file name, and is stored in a storage device, such as the HDD 123, as a file that the CPU 120 can refer to.

As illustrated in FIG. 6A, nodes N7 to N12 that correspond to the peripheral apparatuses 202 to 204 are added to the tree structure T by a user. Since the hand body 220 of the robot hand 202 is linked to the link 216, the node N7 that corresponds to the hand body 220 is added by a user, to the node N6 that corresponds to the link 216 and serves as a parent. In addition, since the two claws 221 and 222 are linked to the hand body 220, the two nodes N8 and N9 that correspond to the two claws 221 and 222 are added by a user, to the node N7 that corresponds to the hand body 220 and serves as a parent. Furthermore, since the virtual processing machine 203V is disposed in the virtual space V, the node N10 that corresponds to the processing machine 203 is added by a user, to the root R that serves as a parent In addition, since the door 231 is linked to the machine body 230, the node N11 that correspond to the door 231 is added by a user, to the node N10 that corresponds to the processing machine 203 and serves as a parent. Furthermore, since the virtual AGV 204V is disposed in the virtual space V, the node N12 that corresponds to the AGV 204 is added by a user, to the root R that serves as a parent As illustrated in FIG. 6A, each of the nodes N7 to N12 is given a unique name by a user. Note that a method of registering the information of each of the nodes N7 to N12 and a method of giving a name to each of the nodes N7 to N12 are the same as those for the above-described nodes N0 to N6.

FIG. 6A illustrates a state in which the node N8 is selected by a user operating the mouse pointer P1 in the registration area 4012 of the window 401. The CPU 120 causes the monitor 113 to display the window 402 as the user interface image UI1. The window 402 is a window in which the CPU 120 can accept the registration of information of the node N8. In this manner, a user can register the information of the node N8 in the CPU 120.

As described above, in Step S200, the CPU 120 accepts the registration of structural data of the peripheral apparatuses 202 to 204, performed by a user operating the input devices. Specifically, the CPU 120 can accept the registration of the virtual robot hand 202V in the user interface image UI1. That is, the CPU 120 can accept the registration of the virtual robot hand 202V by using the names, "hand_base", "hand_claw 1", and "hand_claw 2", assigned to the virtual robot hand 202V. In addition, the CPU 120 can accept the registration of the virtual processing machine 203V in the user interface image UI1. That is, the CPU 120 can accept the registration of the virtual processing machine 203V by using the names, "peripheral apparatus 1_processing machine" and "peripheral apparatus 1_door", assigned to the virtual processing machine 203V. In addition, the CPU 120 can accept the registration of the virtual AGV 204V in the user interface image UI1. That is, the CPU 120 can accept the registration of the virtual AGV 204V by using the name, "peripheral apparatus 2_AGV", assigned to the virtual AGV 204V. Each of the names, "hand_base", "hand_claw 1", and "hand_claw 2", is one example of a fourth name. Each of the names, "peripheral apparatus 1_processing machine" and "peripheral apparatus 1_door", is one example of the fourth name. The name, "peripheral apparatus 2_AGV", is one example of the fourth name.

The CPU 120 then accepts the registration of teach data for the robot arm 201 and the peripheral apparatuses 202 to 204, performed by a user (S300). In Step S300, the CPU 120 causes the monitor 113 to display the user interface image UI1, in which the CPU 120 accepts the registration of teach data for the robot arm 201 and the peripheral apparatuses 202 to 204.

Figure 7:
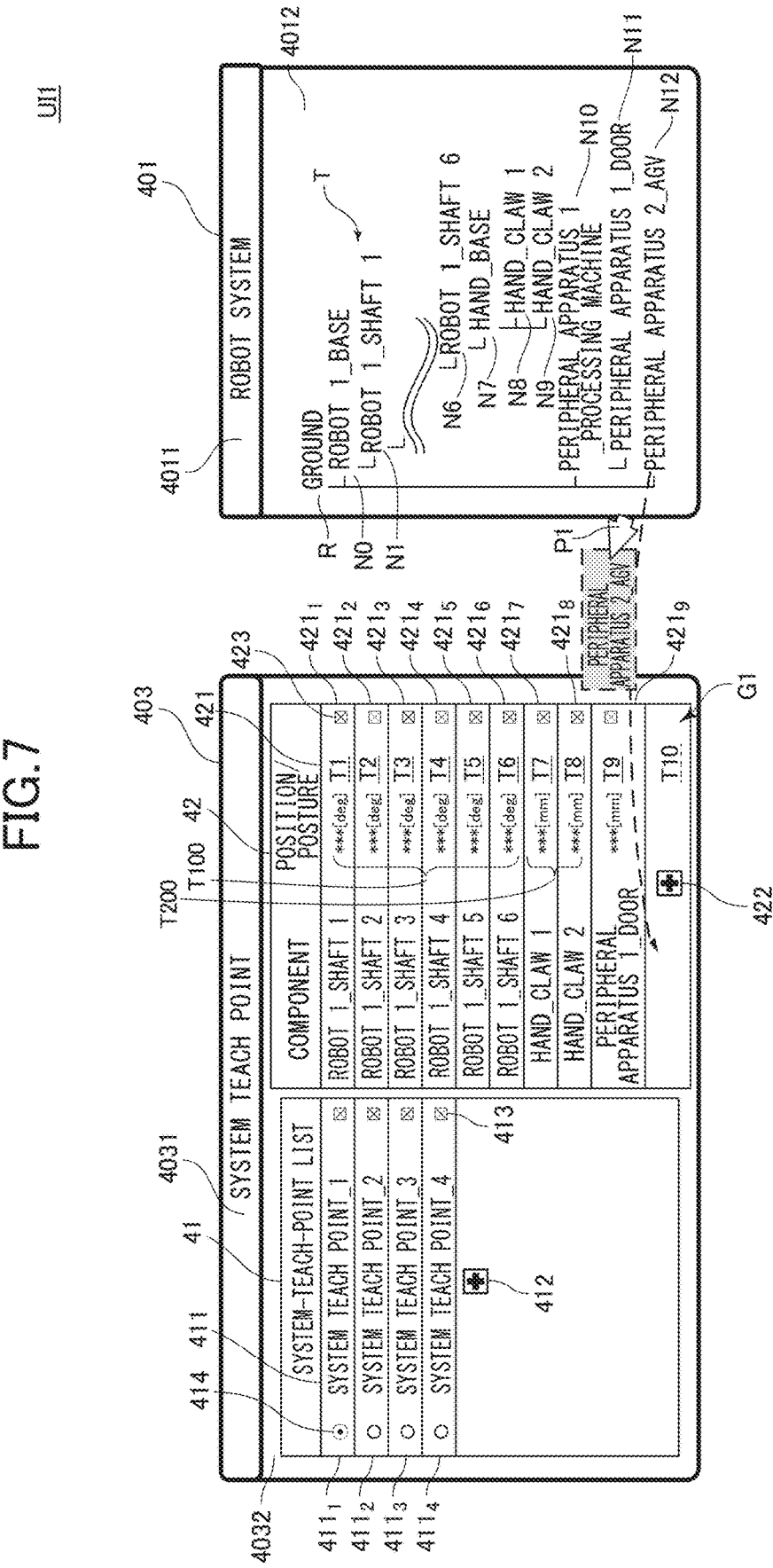
FIG. 7 is a diagram illustrating a user interface image of the first embodiment.

FIG. 7 is a diagram for explaining Step S300. FIG. 7 illustrates a user interface image UI1 displayed on the display screen 150 of the monitor 113 illustrated in FIG. 2. The user interface image UI1 illustrated in FIG. 7 includes the window 401 and a window 403. The window 403 includes a title bar 4031 and a registration area 4032. In the title bar 4031, a name such as "system teach point" is displayed as a title. The registration area 4032 is an area in which a user can input registration information by using the keyboard 111 and the mouse 112, which are one example of input devices. Via the registration area 4032, the CPU 120 accepts the registration of information performed by a user.

The registration area 4032 includes a field 41 that is given a name "system-teach-point list", and afield 42 that accepts the registration of teach data. The field 41 includes a box 411, which accepts a name given to a below-described data set of teach data. The field 42 accepts the registration of a data set of teach data that corresponds to a box 411 selected by a user.

The field 42 includes a box 421 created by a user. A user can input teach data in the box 421 by using the keyboard 111 and the mouse 112. The field 42 includes a button 422. A user can add a box 421 by selecting the button 422 by operating the mouse pointer P1. In addition, the box 421 includes a button 423. A user can delete the box 421 by selecting the button 423 by operating the mouse pointer P1.

As an example, FIG. 7 illustrates boxes $421_1$ to $421_6$ that respectively accept the registration of pieces of teach data T1 to T6 for the links 211 to 216 of the robot arm 201. The pieces of teach data T1 to T6 constitute teach data T100 for the robot arm 201. The teach data T100 is one example of first teach data.

In addition, FIG. 7 illustrates boxes $421_7$ and $421_8$, as an example, that respectively accept the registration of pieces of teach data T7 and T8 for the claws 221 and 222 of the robot hand 202, which is a peripheral apparatus. The pieces of teach data T7 and T8 constitute teach data T200 for the robot hand 202. The teach data T200 is one example of second teach data.

In addition, FIG. 7 illustrates a box $421_9$, as an example, that accepts the registration of pieces of teach data T9 for the processing machine 203, which is a peripheral apparatus. The teach data T9 is one example of the second teach data.

Note that although teach data T10 for the AGV 204 is not registered as illustrated in FIG. 7, the CPU 120 can also accept the registration of the teach data T10 for the AGV 204, which is a peripheral apparatus. The teach data T10 is one example of the second teach data.

Each of the pieces of teach data T1 to T10 is data on a position or posture of a corresponding component. For example, each of the pieces of teach data T1 to T6 is information on an angle of a corresponding link relative to a parent link of the robot arm 201. In addition, each of the pieces of teach data T7 and T8 is information on the amount of opening of a corresponding claw 221 or 222 of the robot hand 202, that is, information on a position of a corresponding claw 221 or 222 with respect to the hand body 220. In addition, the teach data T9 is information on the amount of opening of the door 231 of the processing machine 203, that is, information on a position of the door 231 with respect to the machine body 230.

The CPU 120 selects a node given a name equal to a name of a component inputted in a box 421, from among the plurality of nodes N0 to N12. The CPU 120 then accepts the registration of teach data inputted in the box 421, as teach data for the component of the node. For example, if a name "robot 1_shaft 1" is inputted in a box $421_1$, the CPU 120 accepts the registration of the teach data T1 inputted in the box $421_1$, as teach data for the component 211V, that is, teach data for the link 211.

Note that a name of a node, such as the name "peripheral apparatus 2_AGV" of the node N12, in the tree structure T may be dragged and dropped from the registration area 4012 into the field 42 by operating the mouse pointer P1. With this operation, the input work in the field 42 is simplified.

The pieces of teach data T1 to T10 registered via the field 42 are teach data for instructing the whole of the robot system 1000 at a time. That is, the pieces of teach data T1 to T10 are teach data for instructing the robot arm 201 and the peripheral apparatuses 202 to 204, at a time. The pieces of teach data T1 to T10, which synchronize the operations of the robot arm 201 and the peripheral apparatuses 202 to 204 of the robot system 1000, can be collectively registered in the CPU 120 via the field 42. That is, the pieces of teach data T1 to T10 are associated with each other for synchronizing the operations of the robot arm 201 and the peripheral apparatuses 202 to 204. Thus, in the first embodiment, when teaching is performed for synchronizing the operations of the robot arm 201 and the peripheral apparatuses 202 to 204, the teaching work for the whole of the robot system 1000 is simplified.

Note that the pieces of teach data T1 to T10 for synchronizing the robot arm 201 and the peripheral apparatuses 202 to 204 with each other can be included in a single data set G1. That is, a single data set G1 includes the pieces of teach data T1 to T10. Since the data set G1 is used by the control unit 300 for calculating a trajectory, a plurality of data sets G1 can be created. Preferably, each of the plurality of data sets G1 is given an individual name, and managed.

Thus, in the first embodiment, the plurality of data sets G1 is managed in the field 41 by using a list of names given to the data sets G1. That is, the field 41 is a list of names given to the data sets G1, each of which includes a plurality of pieces of teach data T1 to T10 used for synchronizing respective components with each other.

The field 41 includes at least one box created by a user. In the example of FIG. 7, the field 41 includes a plurality of boxes 411. A user can input a name, which is given to a corresponding data set G1, in a corresponding box 411 by using the keyboard 111 and the mouse 112. The field 41 includes a button 412. A user can add a box 411 by selecting the button 422 by operating the mouse pointer P1. In addition, a box 411 includes a button 413. A user can delete the box 411 by selecting the button 423 by operating the mouse pointer P1.

Each of the plurality of boxes 411 has a unique name given by a user. In the example of FIG. 7, a box $411_1$ has a name "system teach point_1", a box $411_2$ has a name "system teach point_2", a box $411_3$ has a name "system teach point_3", and a box $411_4$ has a name "system teach point_4", which are inputted by a user. Each of the names is one example of a fifth name.

Each of the boxes 411 includes a button 414. If one of a plurality of buttons 414 included in the field 41 is selected by a user operating the mouse pointer P1, a data set G1 that corresponds to the selected box 411 is displayed in the field 42. In the field 42, a user can create, edit, or delete the teach data, as appropriate.

In this manner, the CPU 120 causes the monitor 113 to display the plurality of data sets G1, as a list expressed by using the two fields 41 and 42. In this case, the CPU 120 causes the monitor 113 to display the names assigned to the plurality of data sets G1 in the field 41, as a list constituted by the plurality of boxes 411.

In the example of FIG. 7, the button 414 of the box $411_1$ given a name "system teach point_1" is selected, and a selection mark is given to the button 414 of the box $411_1$. In addition, a plurality of pieces of teach data T1 to T10 of a data set G1 associated with the box $411_1$, that is, the name "system teach point_1" is displayed in the field 42.

The CPU 120 can simulate the state, or the operation, of the virtual robot arm 201V in the virtual space V, depending on the teach data T100 whose registration has been accepted by the CPU 120. In addition, the CPU 120 can simulate the state, or the operation, of the virtual robot hand 202V in the virtual space V, depending on the teach data T200 whose registration has been accepted by the CPU 120. In addition, the CPU 120 can simulate the state, or the operation, of the virtual processing machine 203V in the virtual space V, depending on the teach data 19 whose registration has been accepted by the CPU 120. In addition, the CPU 120 can simulate the state, or the operation, of the virtual AGV 204V in the virtual space V, depending on the teach data T10 whose registration has been accepted by the CPU 120. Specifically, the CPU 120 can perform the above-described simulation, depending on the teach data T1 to T10 corresponding to one of the plurality of data sets G1, specified by a user by selecting a button 414 by operating the mouse pointer P1.

The CPU 120 then causes the monitor 113 to display an image obtained by performing the simulation (S400). FIGS. 8A to 8D are diagrams illustrating one example of overall images I1 to I4 of the first embodiment. The overall image I1 illustrated in FIG. 8A is an image obtained by performing the simulation, depending on the teach data T1 to T10 corresponding to the name "system teach point_1" of FIG. 7, that is, the box 411$_1$. The overall image I2 illustrated in FIG. 8B is an image obtained by performing the simulation, depending on the teach data T1 to T10 corresponding to the name "system teach point_2" of FIG. 7, that is, the box 411$_2$. The overall image I3 illustrated in FIG. 8C is an image obtained by performing the simulation, depending on the teach data T1 to T10 corresponding to the name "system teach point_3" of FIG. 7, that is, the box 411$_3$. The overall image I4 illustrated in FIG. 8D is an image obtained by performing the simulation, depending on the teach data T1 to T10 corresponding to the name "system teach point_4" of FIG. 7, that is, the box 411$_4$.

Suppose that a box specified by a user is the box 411$_1$. That is, a button selected by a user by operating the mouse pointer P1 is a button 414 disposed in the box 411$_1$. In this case, the CPU 120 causes the monitor 113 to display the overall image I1. The overall image I1 is obtained by simulating a state of the plurality of virtual objects in the virtual space V, depending on the teach data T1 to T10 of a data set G1 that corresponds to the box 411$_1$.

The overall image I1 includes a model image I11 that corresponds to the virtual robot arm 201V, a model image I12 that corresponds to the virtual robot hand 202V a model image I13 that corresponds to the virtual processing machine 203V, and a model image I14 that corresponds to the virtual AGV 204V The model image I11 is one example of a first model image. Each of the model images I12 to I14 is one example of a second model image.

The model image I11 is obtained by simulating a state of the virtual robot arm 201V in the virtual space V, depending on the teach data T1 to T6. The model image I12 is obtained by simulating a state of the virtual robot hand 202V in the virtual space V, depending on the teach data T7 and T8. The model image I13 is obtained by simulating a state of the virtual processing machine 203V in the virtual space V, depending on the teach data T9. The model image I14 is obtained by simulating a state of the virtual AGV 204V in the virtual space V, depending on the teach data T10.

In addition, suppose that a box specified by a user is the box 411$_2$. That is, a button selected by a user by operating the mouse pointer P1 is a button 414 disposed in the box 411$_2$. In this case, the CPU 120 causes the monitor 113 to display the overall image I2. The overall image I2 is obtained by simulating a state of the plurality of virtual objects in the virtual space V, depending on the teach data T1 to T10 of a data set G1 that corresponds to the box 411$_2$.

The overall image I2 includes a model image I21 that corresponds to the virtual robot arm 201V, a model image I22 that corresponds to the virtual robot hand 202V a model image I23 that corresponds to the virtual processing machine 203V, and a model image I24 that corresponds to the virtual AGV 204V. The model image I21 is one example of a first model image. Each of the model images I22 to I24 is one example of a second model image.

In addition, suppose that a box specified by a user is the box 411$_3$. That is, a button selected by a user by operating the mouse pointer P1 is a button 414 disposed in the box 411$_3$. In this case, the CPU 120 causes the monitor 113 to display the overall image I3. The overall image I3 is obtained by simulating a state of the plurality of virtual objects in the virtual space V, depending on the teach data T1 to T10 of a data set G1 that corresponds to the box 411$_3$.

The overall image I3 includes a model image I31 that corresponds to the virtual robot arm 201V, a model image I32 that corresponds to the virtual robot hand 202V, a model image I33 that corresponds to the virtual processing machine 203V, and a model image I34 that corresponds to the virtual AGV 204V. The model image I31 is one example of a first model image. Each of the model images I32 to I34 is one example of a second model image.

In addition, suppose that a box specified by a user is the box 411$_4$. That is, a button selected by a user by operating the mouse pointer P1 is a button 414 disposed in the box 411$_4$. In this case, the CPU 120 causes the monitor 113 to display the overall image I4. The overall image I4 is obtained by simulating a state of the plurality of virtual objects in the virtual space V, depending on the teach data T1 to T10 of a data set G1 that corresponds to the box 411$_4$.

The overall image I4 includes a model image I41 that corresponds to the virtual robot arm 201V, a model image I42 that corresponds to the virtual robot hand 202V, a model image I43 that corresponds to the virtual processing machine 203V, and a model image I44 that corresponds to the virtual AGV 204V The model image I41 is one example of a first model image. Each of the model images I42 to I44 is one example of a second model image.

As described above, the CPU 120 causes the monitor 113 to display the overall image I1, I2, I3, or I4, which is obtained by simulating the operation of the plurality of virtual objects 201V to 204V depending of the teach data T1 to T10 of a selected data set G1. With this operation, a user can easily check the operation of the whole of the robot system 1000. In addition, the CPU 120 can accept the registration of data in which the teach data for the robot arm 201 and the teach data for the peripheral apparatuses 202 to 204 are associated with each other. Thus, a user can easily perform teaching work on the whole of the robot system 1000. Note that although the robot hand, the processing machine, and the AGV are used as peripheral apparatuses in the present embodiment, the present disclosure is not limited to this. For example, another robot arm other than the robot arm 201 may be used as a peripheral apparatus.

Second Embodiment

Figure 9A:
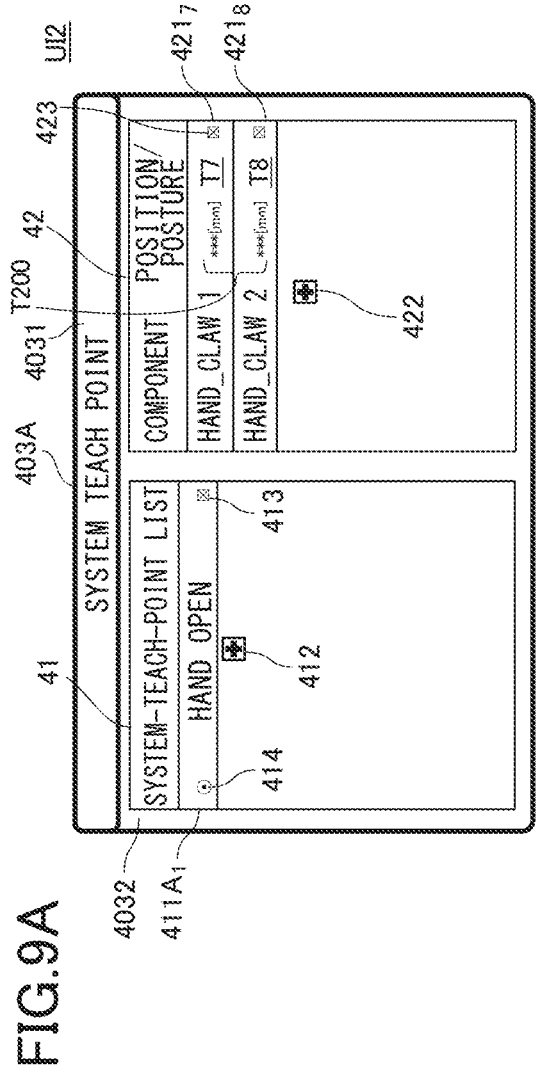
FIG. 9A is a diagram illustrating a user interface image of a second embodiment.
Figure 9B:
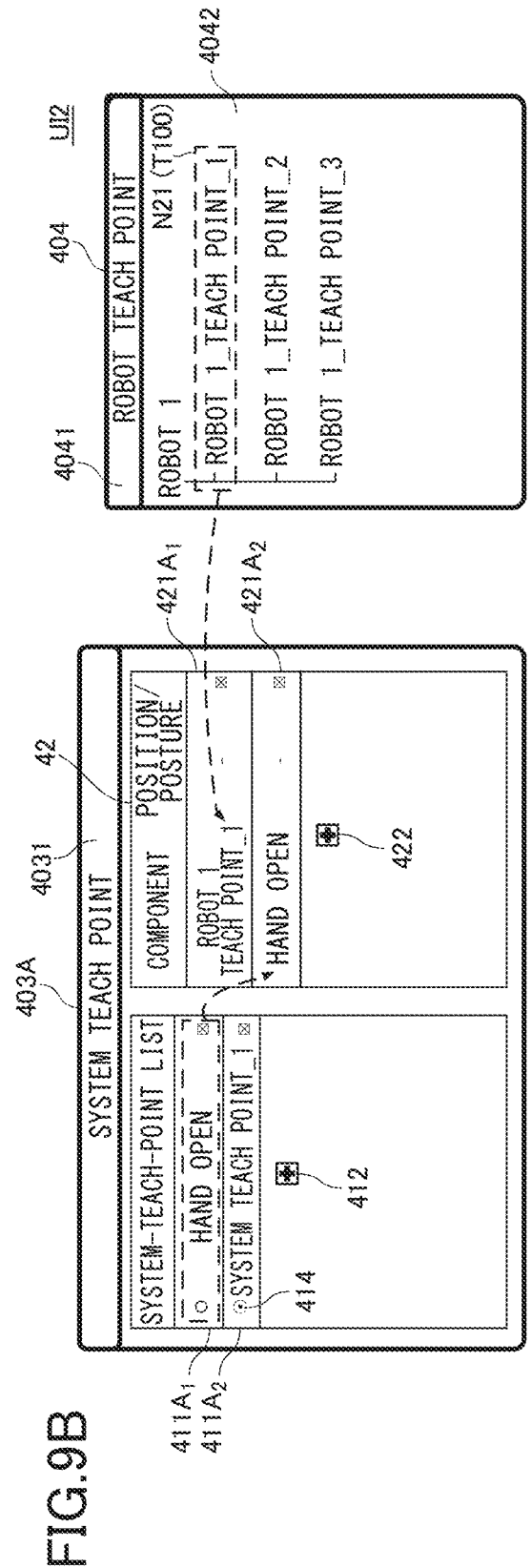
FIG. 9B is a diagram illustrating a user interface image of the second embodiment.

Next, a second embodiment will be described. FIGS. 9A and 9B are diagrams illustrating a user interface image UI2 of the second embodiment Note that the configuration of the whole system is the same as that of the first embodiment. Thus, in the following description, a component identical to a component of the first embodiment is given an identical symbol and the description of the structure of the component will be omitted.

In the second embodiment, a process of Step S300 performed by the CPU 120 is different from that of the first embodiment The CPU 120 can accept the registration of the teach data T100 and the teach data T200 in a user interface image UI2 by using a name assigned in advance to the teach data T100 and a name assigned in advance to the teach data T200.

Specifically, as illustrated in FIG. 9A, the CPU 120 causes the monitor 113 to display a window 403A as a user interface image UI2, instead of the window 403 described in the first embodiment In the window 403A, the CPU 120 can accept the registration of association between the teach data T200 of the robot hand 202 and a unique name.

In the example of FIG. 9A, a name "hand open" is inputted in a box 411A$_1$ of the field 41, and the CPU 120 accepts the registration of the name "hand open". In the field 42, the teach data T7 for the claw 221 is inputted in a box 421$_7$, and the teach data T8 for the claw 222 is inputted in a box 421$_8$. Thus, the CPU 120 accepts the registration of the teach data T200 constituted by the teach data T7 and T8 and assigned to the name "hand open". Similarly, in another window 404 illustrated in FIG. 9B, the CPU 120 accepts the registration of the teach data T100 for the robot arm 201, assigned, for example, to a name "robot 1_teach point_1".

The window 404 includes a title bar 4041 and a registration area 4042. In the title bar 4041, a name such as "robot teach point" is displayed as a title. The registration area 4042 is an area in which a user can input registration information by using the keyboard 111 and the mouse 112, which are one example of input devices. Via the registration area 4012, the CPU 120 accepts the registration of information performed by a user. For example, a node N21 is given the name "robot 1_teach point_1", and is assigned with the teach data T100, as described above.

Suppose that a new box 411A$_2$ is added to the field 41 and selected by a user, as illustrated in FIG. 9B. For example, the box 411A$_2$ is given a name "system teach point_1".

In addition, suppose that the name "robot 1_teach point_1" assigned with the teach data T100 and the name "hand open" assigned with the teach data T200 are inputted in the field 42. When the name "robot 1_teach point_1" and the name "hand open" are inputted in the field 42, the CPU 120 accepts the registration of the teach data T100 for the robot arm 201 and the teach data T200 for the robot hand. The name "robot 1_teach point_1" is one example of a first name, and the name "hand open" is one example of a second name. For example, the name "robot 1_teach point_1" is inputted, by a user, in a box 421A$_1$ formed in the field 42; the name "hand open" is inputted, by a user, in a box 421A$_2$ formed in the field 42. The input work may be performed by a user operating a drag-and-drop operation by using the mouse 112, or by adding a box by pressing the button 422.

Thus, in the second embodiment, the teach data for the robot arm 201 and the peripheral apparatuses 202 to 204 can be registered by using names, such as "robot 1_teach point_1" and "hand open", that are registered in advance. Since a user does not have to input numerical values every time the teach data is registered, the efficiency of teaching work increases. Note that the present embodiment and a modification thereof may be combined with the above-described embodiment and a modification thereof in a predetermined information-processing apparatus or a predetermined information-processing method.

Third Embodiment

Figure 10:
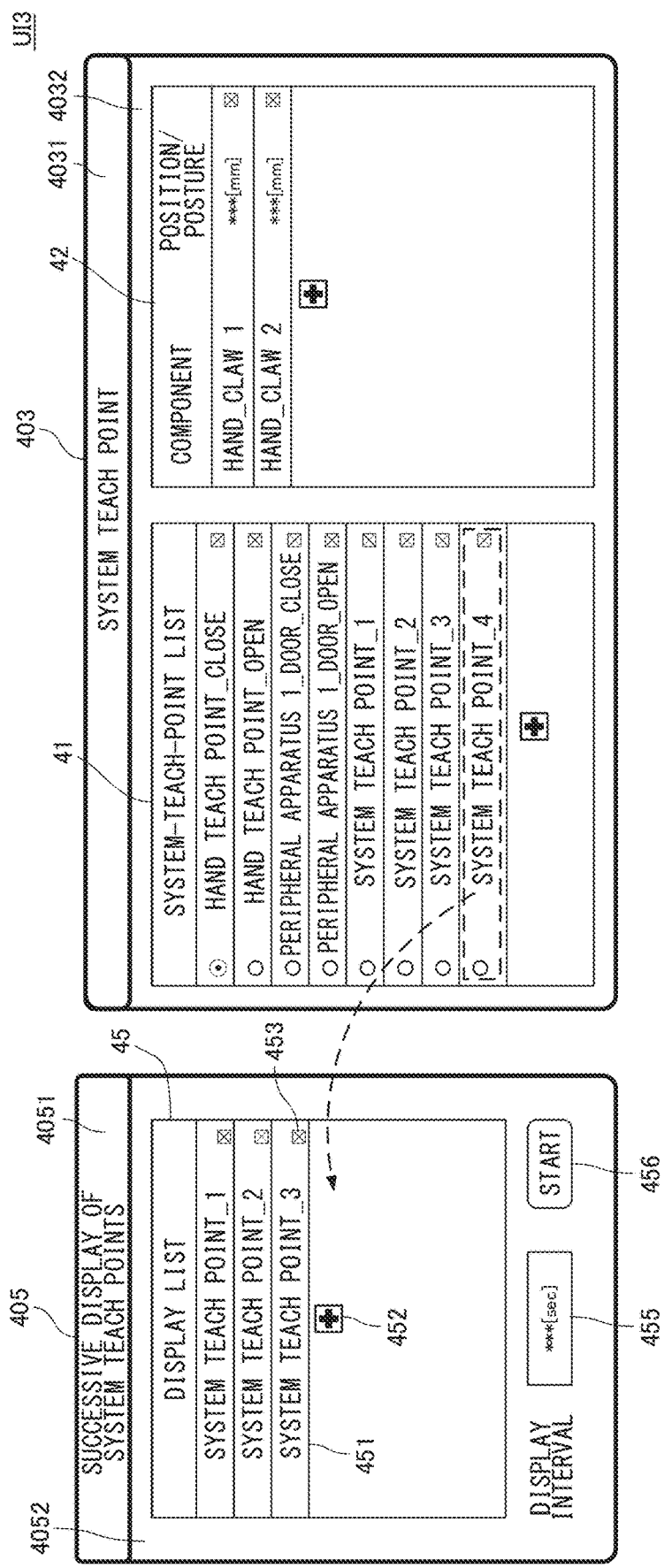
FIG. 10 is a diagram illustrating a user interface image of a third embodiment.

Next, a third embodiment will be described. FIG. 10 is a diagram illustrating a user interface image UI3 of the third embodiment. Note that the configuration of the whole system is the same as that of the first embodiment. Thus, in the following description, a component identical to a component of the first embodiment is given an identical symbol and the description of the structure of the component will be omitted.

The present embodiment differs from the first embodiment in that a window 405 is added to the user interface image UI3. As in the first embodiment, a plurality of data sets is registered in the window 403. Each of the data sets is constituted by pieces of teach data used for instructing a momentary state of the robot system 1000. In the window 405, a reproduction list of data sets is registered by a user referring to the window 403, and images created by the data sets of the reproduction list are successively displayed. Thus, the CPU 120 can cause the monitor 113 to display the images displayed as if the whole of the robot system 1000 were being operated. With this operation, a user can visually recognize the change of state of the robot system 1000, and can more easily check the operation of the robot system 1000.

The window 405 includes a title bar 4051 and a registration area 4052. In the title bar 4051, a name such as "successive display of system teach points" is displayed as a title. The registration area 4052 include a display list 45 in which a user can input registration information by using the keyboard 111 and the mouse 112, which are one example of input devices.

The display list 45 includes a box 451 created by a user. A user can input a name corresponding to a data set G1 (FIG. 7) in the box 451 by using the keyboard 111 and the mouse 112. The display list 45 includes a button 452. A user can add a box 451 by selecting the button 452 by operating the mouse pointer. In addition, the box 451 includes a button 453. A user can delete the box 451 by selecting the button 453 by operating the mouse pointer. The display list 45 is created by a user inputting a name in the box 451.

Via the display list 45, the CPU 120 accepts the registration of information performed by a user. For example, in the display list 45, the names "system teach point_1", "system teach point_2", "system teach point_3", and "system teach point_4", which have been described in the first embodiment, are registered in this order by a user. Each name is associated with a corresponding data set G1. The input work on the display list 45 may be performed by a user operating a drag-and-drop operation by using the mouse 112, or by inputting letters in a box 451 (which is added by selecting the button 452) by using the keyboard 111. The data set G1 associated with each name includes a plurality of pieces of teach data T1 to T10.

For example, two or more of the plurality of data sets G1 selected by a user are four data sets G1 corresponding to the names "system teach point_1" to "system teach point_4".

The CPU 120 causes the monitor 113 to display the overall images I1, I2, I3, and I4, which correspond to the four data set G1 and are illustrated in FIGS. 8A to 8D, such that the overall images I1, I2, I3, and I4 are switched (that is, displayed, image by image) in this order at predetermined time intervals. That is, in the descending order in the list created in the window 405, the CPU 120 performs the simulation and causes the monitor 113 to display the overall images. The time intervals can be registered by inputting a value in a box 455 of the window 405. In addition, when a start button 456 is selected by a user, the display of the overall images I1 to I4 is started. With this operation, the overall images I1 to I4 are switched (that is, displayed, image by image), so that a user can easily check the operation of the whole of the robot system 1000. Note that the present embodiment and a modification thereof may be combined with the above-described embodiment and a modification thereof in a predetermined information-processing apparatus or a predetermined information-processing method.

Fourth Embodiment

Figure 11A:
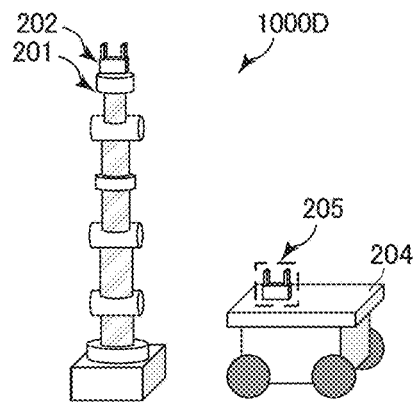
FIG. 11A is a diagram illustrating a robot system of a fourth embodiment.
Figure 11B:
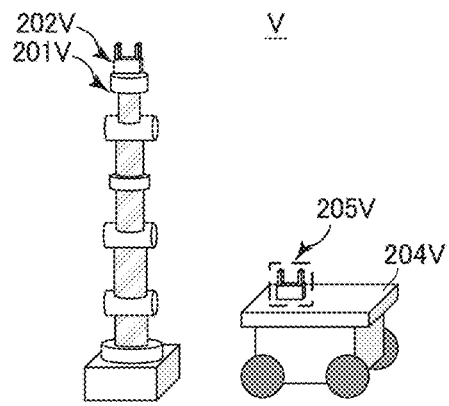
FIG. 11B is a diagram illustrating a virtual space, and virtual objects disposed in the virtual space in the fourth embodiment.
Figure 11C:
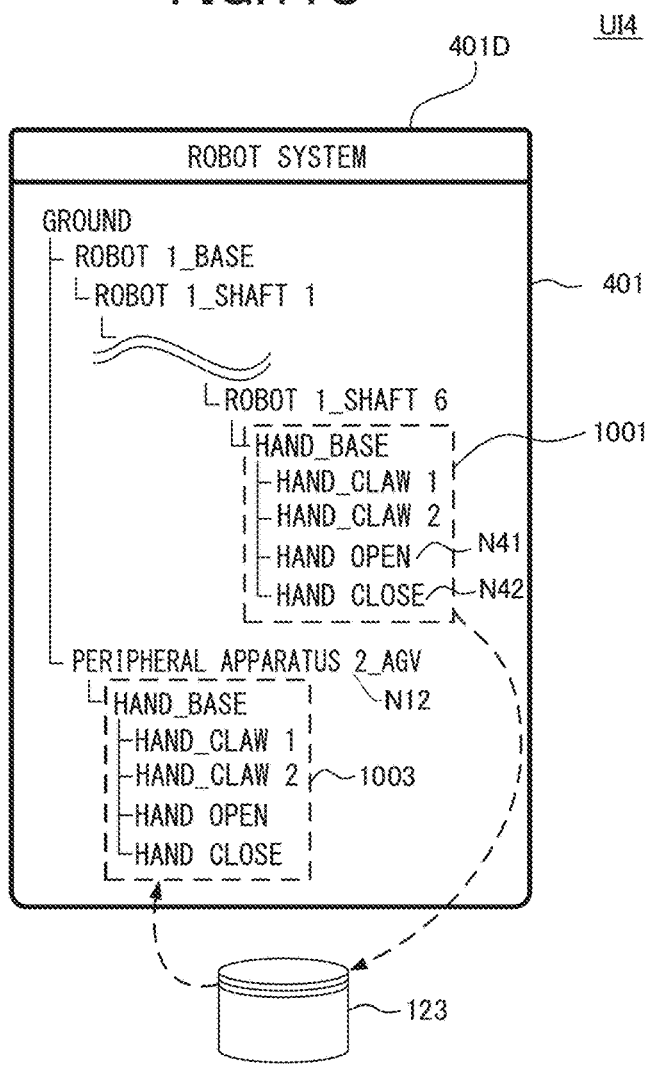
FIG. 11C is a diagram illustrating a user interface image of the fourth embodiment.

Next, a fourth embodiment will be described. FIG. 11A is a diagram illustrating a robot system 1000D of the fourth embodiment FIG. 11B is a diagram illustrating a virtual space V, and virtual objects disposed in the virtual space V in the fourth embodiment FIG. 11C is a diagram illustrating a user interface image UI4 of the fourth embodiment The robot system 1000D includes the robot arm 201, the robot hand 202, and the AGV 204, which have been described in the first embodiment. In addition, the robot system 1000D includes a robot hand 205 attached to the AGV 204. The robot hand 205 has the same structure as that of the robot hand 202. The robot hand 202 attached to the robot arm 201 is one example of a first peripheral apparatus, and the robot hand 205 attached to the AGV 204 is one example of a second peripheral apparatus.

The present embodiment differs from the first embodiment in that a window 401D is used in the user interface image UI4, instead of the window 401. In the first embodiment, the method of registering the models of the peripheral apparatuses 202 to 204 and the method of registering the teach data for the peripheral apparatuses 202 to 204 have been described. In the fourth embodiment, a method of reusing a registered model and teach data will be described.

As illustrated in FIG. 11C, in the fourth embodiment, a node N41 and a node N42 are added to the tree structure T. The node N41 has a name "hand open" associated with teach data that is registered in advance. The node N42 has a name "hand close" associated with teach data that is registered in advance.

The CPU 120 stores a group 1001 that includes data of the virtual robot hand 202V and teach data corresponding to the nodes N41 and N42, in the HDD 123. The teach data corresponding to the nodes N41 and N42 is one example of second teach data.

For example, a user adds a group 1003 to the node N12, as a child. The group 1003 is the same as the group 1001 stored in the HDD 123. The CPU 120 then accepts the registration of the group 1003. In this manner, a group that a user has registered once can be reused. In this example, the simulation is performed in the virtual space V so that the virtual robot hand 202V is attached to the virtual robot arm 201V and that the virtual robot hand 205V that has the same configuration of the virtual robot hand 202V is attached to the virtual AGV 204V. As described above, in the user interface image UI4, the CPU 120 can accept the registration of information of the group 1001, which was registered for the robot hand 202, also as the registration of information for the robot hand 205. Thus, since the information of the group 1001 related to the structure of a peripheral apparatus can be reused, the registration work or the teaching work is simplified. Note that the present embodiment and a modification thereof may be combined with the above-described embodiment and a modification thereof in a predetermined information-processing apparatus or a predetermined information-processing method.

Note that although the description has been made, in the first to the fourth embodiments, for the case where the robot arm 201 is a vertically articulated robot arm, the present disclosure is not limited to this. For example, the robot arm may be any one of various robot arms, such as a horizontally articulated robot arm, a parallel link robot arm, and a Cartesian coordinate robot arm. In addition, the mechanism for holding a workpiece may be achieved by a machine that can automatically perform expansion and contraction motion, bending and stretching motion, up-and-down motion, right-and-left motion, pivot motion, or combination motion thereof, depending on information data stored in the storage device of the control device.

As described above, the present disclosure simplifies the teaching work for the whole system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198197, filed Dec. 7, 2021, which is hereby incorporated by reference herein in its entirety.

What is claimed is:

1. An information processing apparatus comprising:
an information processing portion configured to accept registration of first teach data and second teach data such that the first teach data and the second teach data are associated with each other, the first teach data being related to a robot arm, the second teach data being related to a peripheral apparatus disposed around the robot arm,
wherein the information processing portion is configured to cause a display portion to display a user interface in which the information processing portion accepts the registration of the first teach data and the second teach data, wherein the information processing portion is configured
to accept registration of a first model that corresponds
to the robot arm, and a second model that corresponds
to the peripheral apparatus, in the user interface, and
wherein the information processing portion is configured
to:
simulate a state of the first model in a virtual space
based on the first teach data, and
simulate a state of the second model in the virtual space
based on the second teach data.

2. The information processing apparatus according to claim 1, wherein the information processing portion is configured to accept the registration of the first teach data and the second teach data in the user interface image by using a first name assigned to the first teach data and a second name assigned to the second teach data.

3. The information processing apparatus according to claim 2, wherein the information processing portion is configured to accept assignment between the second name and the second teach data in the user interface image.

4. The information processing apparatus according to claim 1, wherein the information processing portion is configured to accept the registration of the first model and the second model in the user interface image by using a third name assigned to the first model and a fourth name assigned to the second model.

5. The information processing apparatus according to claim 1, wherein the information processing portion is configured to cause the display portion to display a first model image obtained by simulating a state of the first model in the virtual space, depending on the first teach data, and a second model image obtained by simulating a state of the second model in the virtual space, depending on the second teach data.

6. The information processing apparatus according to claim 5, wherein the information processing portion is configured to accept registration of a plurality of data sets each including the first teach data and the second teach data, and
wherein the information processing portion is configured to cause the display portion to display the first model image and the second model image that correspond to a data set that is of the plurality of data sets, and that is specified by a user.

7. The information processing apparatus according to claim 5, wherein the information processing portion is configured to accept registration of a plurality of data sets each including the first teach data and the second teach data, and
wherein the information processing portion is configured to cause the display portion to display the first model image and the second model image that correspond to each of two or more data sets that are of the plurality of data sets, and that are specified by a user, such that images each including the first model image and the second model image are switched.

8. The information processing apparatus according to claim 1, wherein the information processing portion is configured to accept registration of a plurality of data sets each including the first teach data and the second teach data.

9. The information processing apparatus according to claim 1, wherein the information processing portion is configured to accept registration of a plurality of data sets each including the first teach data and the second teach data, and wherein the information processing portion is configured to cause the display portion to display the plurality of data sets, sets as a list.

10. The information processing apparatus according to claim 1, wherein the information processing portion is configured to accept registration of a plurality of data sets each including the first teach data and the second teach data, and
wherein the information processing portion is configured to cause the display portion to display a fifth name assigned to each of the plurality of data sets, and to display the fifth name as a list.

11. The information processing apparatus according to claim 1, wherein the peripheral apparatus is a first peripheral apparatus, and
wherein the information processing portion is configured to accept, in the user interface image, registration of information of a group associated with the first peripheral apparatus and including the second model and the second teach data as registration of information associated with a second peripheral apparatus.

12. A system comprising:
an information processing apparatus;
a robot arm;
a peripheral apparatus; and
the information processing apparatus comprising:
an information processing portion configured to accept registration of first teach data and second teach data such that the first teach data and the second teach data are associated with each other, the first teach data being related to the robot arm, the second teach data being related to the peripheral apparatus disposed around the robot arm,
wherein the information processing portion is configured to cause a display portion to display a user interface in which the information processing portion accepts the registration of the first teach data and the second teach data,
wherein the information processing portion is configured to accept registration of a first model that corresponds to the robot arm, and a second model that corresponds to the peripheral apparatus, in the user interface, and
wherein the information processing portion is configured to:
simulate a state of the first model in a virtual space based on the first teach data, and
simulate a state of the second model in the virtual space based on the second teach data.

13. The system according to claim 12, further comprising a controller configured to;
control the robot arm depending on the first teach data obtained from the information processing apparatus, and
control the peripheral apparatus depending on the second teach data obtained from the information processing apparatus.

14. An information processing method comprising:
accepting registration of first teach data and second teach data such that the first teach data and the second teach data are associated with each other, the first teach data being related to a robot arm, the second teach data being related to a peripheral apparatus disposed around the robot arm;
displaying a user interface in which an information processing portion accepts the registration of the first teach data and the second teach data;
accepting registration of a first model that corresponds to the robot arm, and a second model that corresponds to the peripheral apparatus, in the user interface;

simulating a state of the first model in a virtual space based on the first teach data; and simulating a state of the second model in the virtual space based on the second teach data.

15. A method of manufacturing products by using a robot arm and a peripheral apparatus whose operation is simulated by an information processing apparatus, the information processing apparatus comprising:

an information processing portion configured to accept registration of first teach data and second teach data such that the first teach data and the second teach data are associated with each other, the first teach data being related to the robot arm, the second teach data being related to the peripheral apparatus disposed around the robot arm, wherein the information processing portion is configured to cause a display portion to display a user interface in which the information processing portion accepts the registration of the first teach data and the second teach data, wherein the information processing portion is configured to accept registration of a first model that corresponds to the robot arm, and a second model that corresponds to the peripheral apparatus, in the user interface, and wherein the information processing portion is configured to:

simulate a state of the first model in a virtual space based on the first teach data, and simulate a state of the second model in the virtual space based on the second teach data.

16. A non-transitory computer-readable recording medium storing a program that causes a computer to execute the information processing method comprising:

accepting registration of first teach data and second teach data such that the first teach data and the second teach data are associated with each other, the first teach data being related to a robot arm, the second teach data being related to a peripheral apparatus disposed around the robot arm;

displaying a user interface in which an information processing portion accepts the registration of the first teach data and the second teach data;

accepting registration of a first model that corresponds to the robot arm, and a second model that corresponds to the peripheral apparatus, in the user interface;

simulating a state of the first model in a virtual space based on the first teach data; and simulating a state of the second model in the virtual space based on the second teach data.

* * * * *